US007106209B2

(12) United States Patent
Mui

(10) Patent No.: US 7,106,209 B2
(45) Date of Patent: Sep. 12, 2006

(54) PROGRAMMING A UNIVERSAL REMOTE CONTROL

(75) Inventor: Daniel SauFu Mui, San Jose, CA (US)

(73) Assignee: ZiLOG, Inc., San Jose, CA (US)

(*) Notice: Subject to any disclaimer, the term of this patent is extended or adjusted under 35 U.S.C. 154(b) by 174 days.

(21) Appl. No.: 10/361,281

(22) Filed: Feb. 10, 2003

(65) Prior Publication Data

US 2004/0155793 A1 Aug. 12, 2004

(51) Int. Cl.
*G05B 19/02* (2006.01)
*G08C 19/00* (2006.01)

(52) U.S. Cl. .......................... 340/825.22; 340/825.69; 340/825.71; 341/176

(58) Field of Classification Search ........... 340/825.22, 340/825.69, 825.71, 310.01, 825.07, 825.56, 340/825.57; 341/176; 359/148; 348/734
See application file for complete search history.

(56) References Cited

U.S. PATENT DOCUMENTS

| | | | | | |
|---|---|---|---|---|---|
| 4,999,622 | A | * | 3/1991 | Amano et al. | 340/825.72 |
| 5,028,919 | A | * | 7/1991 | Hidaka | 340/825.72 |
| 5,175,538 | A | * | 12/1992 | Kurita | 340/825.69 |
| 5,519,457 | A | * | 5/1996 | Nishigaki et al. | 348/734 |
| 5,726,645 | A | * | 3/1998 | Kamon et al. | 340/825.22 |
| 5,745,068 | A | * | 4/1998 | Takahashi et al. | 341/176 |
| 5,793,300 | A | * | 8/1998 | Suman et al. | 340/825.22 |
| 6,072,404 | A | * | 6/2000 | Nolan et al. | 340/825.69 |
| 6,097,309 | A | * | 8/2000 | Hayes et al. | 340/825.69 |
| 6,130,625 | A | * | 10/2000 | Harvey | 340/825.72 |
| 6,133,847 | A | * | 10/2000 | Yang | 340/825.22 |
| 6,249,673 | B1 | * | 6/2001 | Tsui | 455/92 |
| 6,633,281 | B1 | * | 10/2003 | Lin et al. | 345/173 |
| 6,788,199 | B1 | * | 9/2004 | Crabtree et al. | 340/539.13 |
| 2002/0163440 | A1 | * | 11/2002 | Tsui | 340/825.69 |

OTHER PUBLICATIONS

Brian Millier, "IR Remote Control Basics," Sep. 1999, www.circuitcellar.com/library/ccofeature/millier0999/c99bm2.htm.
"Introducing the Harmony Remote SST-768," www.harmonyremote.com/cutsheet_sst-768.htm.

* cited by examiner

*Primary Examiner*—Wendy R. Garber
*Assistant Examiner*—Nam Nguyen
(74) *Attorney, Agent, or Firm*—Silicon Edge Law Group LLP; Darien K. Wallace; T. Lester Wallace

(57) ABSTRACT

A method for programming a universal remote control comprises receiving a signal from a source remote control, determining characteristic information based on the signal, comparing the characteristic information to a database, determining a matching code set for the source remote control based on the comparing, and configuring the universal remote control to mimic control features of the source remote control based on the matching code set. Still other aspects and other features are also described herein.

22 Claims, 4 Drawing Sheets

PROGRAMMING A UNIVERSAL REMOTE CONTROL

BACKGROUND

Many electronic devices (e.g., TVs, VCRs, DVD players, satellite receivers, set-top boxes, garage door openers, etc.) can be controlled by their corresponding remote controls. However, as one accumulates more electronic devices, these remote controls can cause undesirable clutter in one's home. Further, when a source remote control (SRC) is inadvertently misplaced, the corresponding device cannot be controlled by other remote controls.

Universal remote controls (URC) have been introduced to solve these problems. A URC typically can be programmed to control one or more electronic devices and, thus, can replace one or more source remote control. Typically, a user of a URC is provided with a manual which includes code sets for a plurality of source remote controls. The user has to determine the correct code set corresponding to each SRC to be programmed into the URC, then manually enter that code set into the URC. This process is tedious and time consuming. Further, if the manual for the URC is lost, the user will have no way to program the URC except by obtaining another manual from the manufacturer. In addition, the types (e.g., manufacturers & models) of SRCs that may be programmed into the URC are limited to the code sets provided in the manual.

Some URCs have the capability of being programmed without requiring the user to manually enter a code set. This type of URC is typically able to operate in a so-called "learning mode," where the URC is able to duplicate a signal received from each key of a SRC and store that signal in memory. For example, commonly available URCs for consumer electronic devices (e.g., TVs, etc.), as well as for garage door openers (e.g., the HomeLink system) operate in this fashion. Programming a URC in a learning mode has several drawbacks. First, the URC can only duplicate signals from SRC keys that are physically pressed by the user. Thus, the user has to press every one of the keys on a SRC to be programmed. While this may be acceptable for single-key (or, equivalently, single-signal) devices such as garage door openers, it is inconvenient for multiple-key (or multiple-signal) devices such as TV remote controls. Second, duplication of signals can be time consuming. Third, the URC needs a relatively large memory space to store all the signals from the keys of each SRC to be programmed, thus increasing the cost of the URC. All of the foregoing illustrates that such "learning" remote controls are dumb devices that simply memorize the characteristics of any given SRC, rather than being able to recognize and identify a given SRC.

Thus, a market exists for a universal remote control that can be virtually automatically programmed, whereby a user will not need to select a code set from a manual, enter the code set manually, and teach the URC to learn each SRC key separately.

SUMMARY

Various exemplary simplified programming processes are described herein for programming a universal remote control to mimic control features of one or more SRC. The universal remote control implementing the simplified programming processes would generally require a relatively smaller memory. For example, in one implementation, a user is not required to teach the URC to learn each SRC key separately; learning each key separately is a relatively more memory intensive process.

An exemplary method for programming a universal remote control comprises (a) receiving a signal from a source remote control, (b) determining characteristic information based on the signal, (c) comparing the characteristic information to a database of the universal remote control, (d) determining a matching code set for the source remote control based on the comparison, and (e) configuring the universal remote control to mimic control features of the source remote control based on the matching code set.

An exemplary universal remote control comprises a receiver for receiving a signal from a source remote control, and a processor for performing a recognition operation that includes: (a) determining characteristic information based on the signal, (b) comparing the characteristic information to a local database, (c) determining a matching code set for the source remote control based on the comparison, and (d) configuring the universal remote control to mimic the source remote control based on the matching code set.

Other exemplary embodiments and aspects are also disclosed.

DETAILED DESCRIPTION

I. Overview

Section II describes an exemplary universal remote control.

Section III describes an exemplary process for programming a universal remote control.

Section IV describes exemplary recognition and configuration processes to be performed when programming a universal remote control.

Section V describes an exemplary process for determining certain characteristic information.

Section VI describes other exemplary aspects and embodiments.

Section VII describes an exemplary operating environment.

II. A Universal Remote Control

Figure 1:
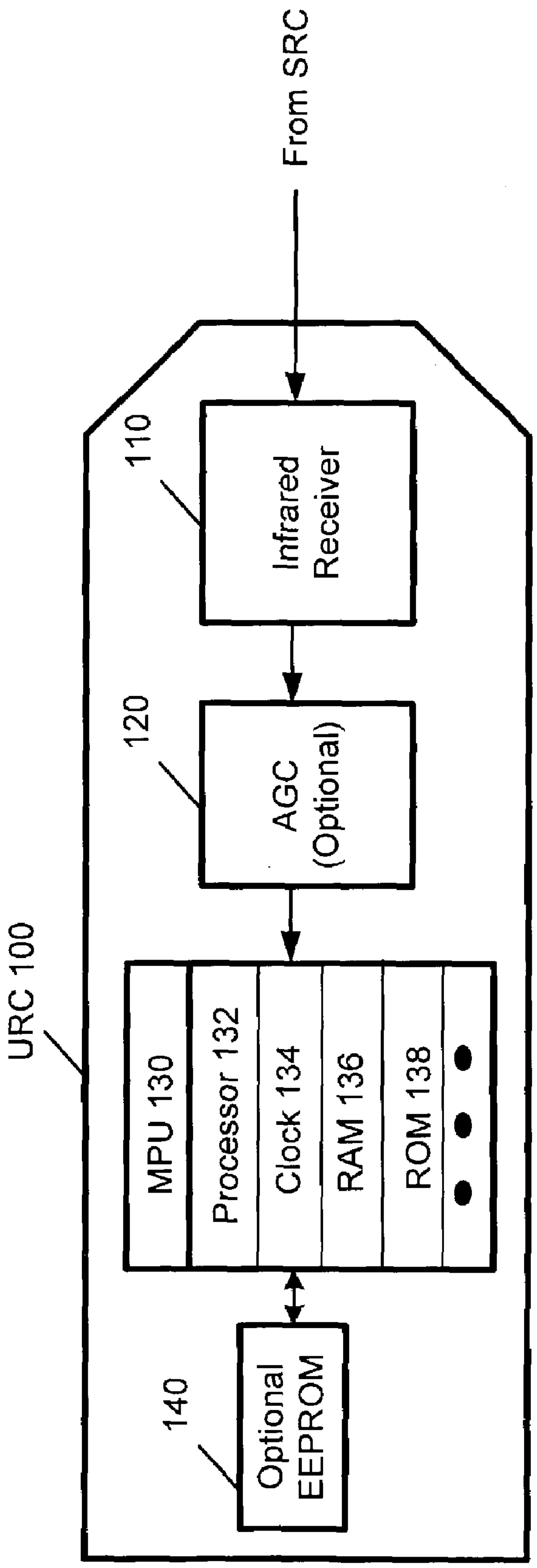
FIG. 1 illustrates an exemplary universal remote control.

FIG. 1 illustrates an exemplary universal remote control (URC) 100. The URC 100 includes an infrared receiver 110, an optional automatic gain control unit (AGC) 120, and a microprocessing unit (MPU) 130. In an exemplary embodiment, the URC 100 may also include an optional EEPROM 140 to be used as storage.

The infrared receiver 110 is configurable to receive infrared signal(s) from a source remote control (SRC). Of course, infrared signals are merely exemplary and can be replaced with any other electromagnetic signal (such as a radio signal, etc.).

The optional AGC 120 converts the analog signal received by the infrared receiver 110 to a digital signal to be processed by the MPU 130. In an exemplary implementation, the infrared receiver 110 and the optional AGC 120 may be implemented as a single component (not shown) or two separate components coupled to each other. Depending on the requirements of a particular implementation (e.g., size, form factor, budget, etc.), individual electronic components within the infrared receiver 110 and/or the AGC 120 may be assembled using standard electronic components, or even purchased pre-assembled from commercially available sources. In either case, technologies for manufacturing the infrared receiver 110 and the AGC 120 are well known in the art and widely commercially available, thus need not be described in more detail herein. Alternatively, an analog-to-digital converter (not shown) well known in the art may be implemented internally within the MPU 130 (or external to the MPU 130). The analog-to-digital converter may be used to convert analog signals received from the infrared receiver 110. In this implementation, URC 100 may not include the AGC 120.

The MPU 130 includes a processor 132, a clock 134, a RAM 136, a ROM 138, and other components (not shown) as appropriate. The processor 132 is capable of executing logic instructions stored in the ROM 138. The clock 134 provides timing control to facilitate the operation of the processor 132. The RAM 136 stores data including a database containing code sets for multiple SRCs. For example, the database may include one or more types of characteristic information of each SRC and a mapping of the characteristic information to a corresponding code set for that SRC. In an exemplary implementation, the code set for each SRC includes codes necessary to program the keys of the SRC onto the URC to allow the URC to mimic control features of the SRC.

A more detailed description about exemplary types of characteristic information is provided in Sections IV and V below.

In an exemplary embodiment, the URC includes an EEPROM 140, internal or external to the MPU 130 depending on design choice. The EEPROM 140 may be used to store some or all of the database described above and/or other data. Generally, if an EEPROM 140 is implemented, the memory size of the RAM 136 may be reduced.

For clarity of illustration, we have omitted certain typical features such as a power source, an indicator light (e.g., a LED) for indicating, for example, whether the URC is in a programming mode, keys (or a key pad) allowing a user to operate the URC, and other incidental details. Each of these can be implemented using well known commercially available components, and need not be described in detail herein.

Further, the internal configuration of the URC 100 is highly flexible, and virtually any physical or logical configuration can be used while still remaining within the spirit of the programming technologies presented herein.

III. Programming a Universal Remote Control

Figure 2:
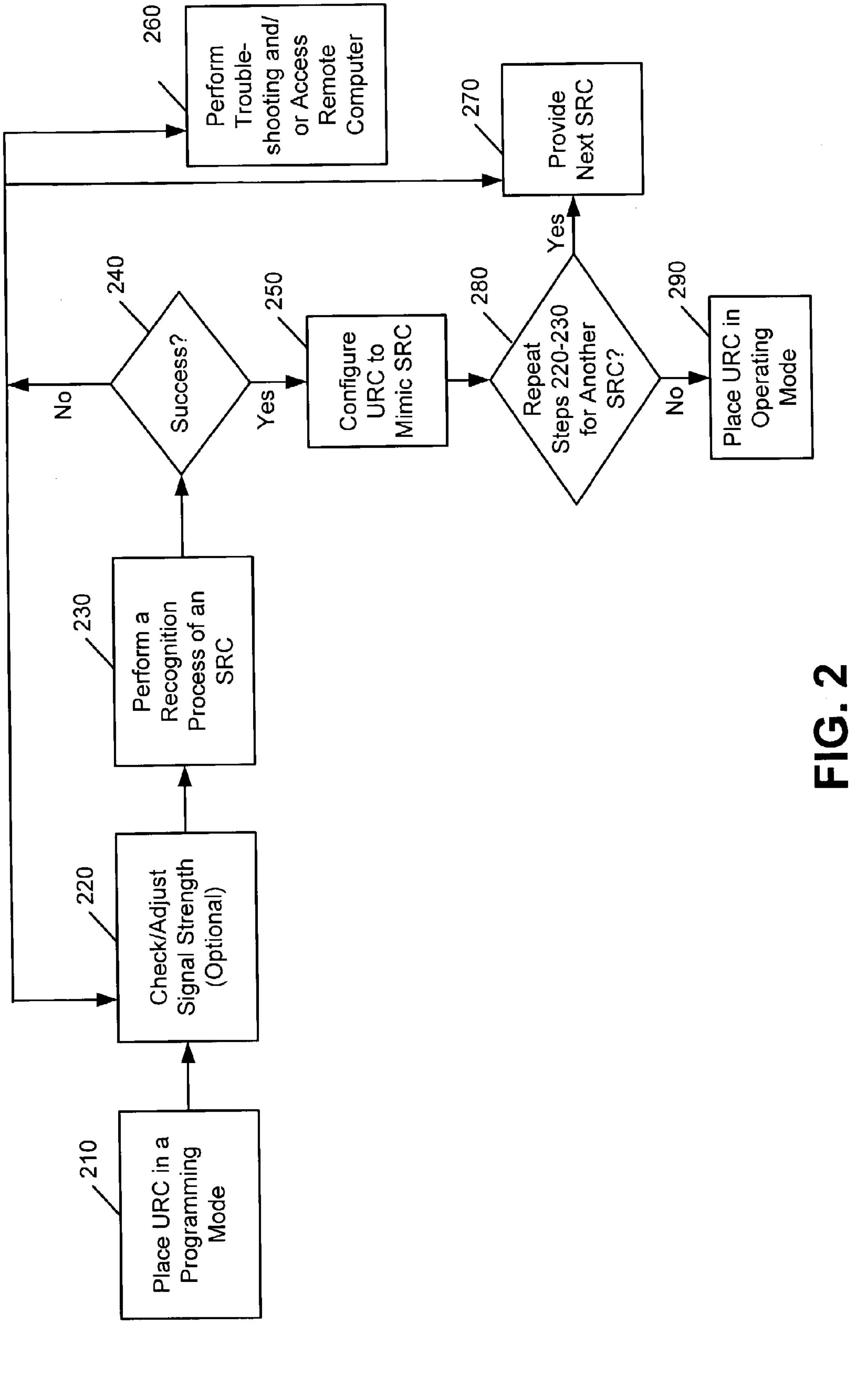
FIG. 2 illustrates an exemplary process for programming the universal remote control of FIG. 1.

An exemplary process for programming a URC is provided in FIG. 2.

At step 210, a URC is placed in a programming mode. For example, in one implementation, the URC may have a program key that can be pressed to place the URC in a programming mode. In another implementation, if the URC is configurable to control multiples types of devices (e.g., TVs, VCRs, etc.), then the device-type key may be pressed to place the URC in a programming mode. Technologies for placing a remote control in a programming mode are well known and other implementations can be readily appreciated by one skilled in the art. If a key on the URC is pressed to place the URC in a programming mode, that key may be released after the URC is already in a programming mode. Whether a URC is in a programming mode may be indicated to a user via an indicator light (e.g., a LED). For example, the indicator light may be triggered to light up and/or blink for one or more times.

At step 220, an optional step for checking signal strength may be performed. This step is useful where the signal may be insufficient to be recognized by the URC. For example, the URC might have a relatively insensitive receiver, the SRC may have a weak transmitter (or a weak battery), or the SRC and URC may simply be too far apart. In an exemplary implementation, a key on the SRC is pressed while moving the SRC toward (or away from) the URC until the URC indicates to a user that an acceptable (e.g., sufficiently strong) signal is being received by the URC. For example, an indicator light on the URC may be triggered to light up and/or blink for one or more times. In this example, the indicator light may light up when the URC is receiving a sufficiently strong signal to program the URC. Alternatively, the URC may be moved toward (or away from) the SRC instead.

At step 230, a recognition process is performed to recognize the SRC. A more detailed description of an exemplary implementation of the recognition process is provided in Section IV below. If the recognition process is successful (step 240), the URC is configured to mimic the SRC (step 250). Next, whether there is another SRC to be programmed is determined (step 280). If there is another SRC to be programmed, the new SRC is provided (step 270) and steps 220–230 are repeated. If there is no other SRC to be programmed, the URC may be placed in an operating mode (step 290).

Referring back to step 240, if the recognition process of step 230 is unsuccessful, the user has several options. First, the user may check/adjust signal strength again (step 220), then repeat the recognition process (step 230). Second, the user may perform one or more troubleshooting techniques and/or access remote computing devices (e.g., to check for database updates and/or to identify the SRC) (step 260). Troubleshooting techniques and database updates are described in more detail in Section VI below. Third, the user may move on to try to program another SRC (step 270) and repeat steps 220–230 for that new SRC.

IV. Recognizing a Source Remote Control

Figure 3:
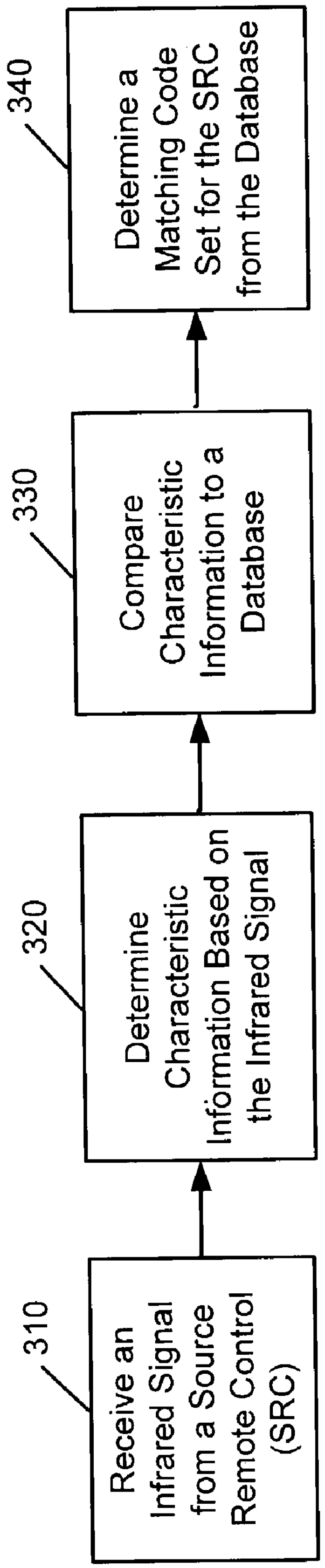
FIG. 3 illustrates an exemplary recognition process.

The recognition process 230 of FIG. 2 is described in more detail in this Section. FIG. 3 illustrates an exemplary recognition process to recognize an SRC.

At step 310, an infrared signal is received from an SRC. For example, a user may press a key on the SRC to send an infrared signal. The selection of the key to be pressed on the SRC is generally immaterial. The infrared signal is transferred to the URC via the infrared light bandwidth and is received by the infrared receiver 110 (see FIG. 1) as an analog signal. The infrared signal is then converted to a digital signal (e.g., by the optional AGC 120 or an analog-to-digital converter) then outputted to the MPU 130 (see FIG. 1).

At step 320, one or more types of characteristic information of the SRC are determined by processor 132 based on the digital infrared signal. The characteristic information will be discussed in greater detail in Section V below.

At step 330, one or more types of characteristic information determined at step 320 are compared to a database in the RAM 138 and/or the EEPROM 140 to find a matching code set for the SRC, and thereby identify the SRC as being of a known type. For example, if a first type of characteristic information of an SRC is so unique such that the processor 132 can immediately find a matching code set in the database, then there may be no need to determine and/or compare other types of characteristic information.

At step 340, if a matching code set for the SRC is found based on the comparing at step 330, then the SRC can be recognized by the URC using the matching code set. This matching code set typically includes all the codes necessary to allow the URC to mimic the control features of the SRC. Technologies for programming the URC once a matching code set is found is well known in the art and need not be described in more detail herein.

V. Determining Certain Characteristic Information

Exemplary processes for determining certain characteristic information are described in this Section.

A. Signal Structure and Transmission

A typical infrared signal transmitted when a user presses a button of the SRC includes three portions: a header portion, a data portion, and a tail portion. The header is used to indicate that what follows is a data signal. The tail is used to indicate the end of the data signal.

The signal is modulated according to some protocol. However, there is no standard for remote controls, even within a given type of device. Thus, for example, SRCs from different manufacturers may use a variety of different modulation protocols. Indeed, any given manufacturer may even use different modulation protocols for different types of devices (e.g., TVs v. VCRs). For example, some common modulation types used for infrared signals in consumer electronics remote controls include, without limitation, constant carrier modulation (CCM), base band (BB), frequency shift key (FSK), complex frequency shift key (C_FSK), etc. The modulated signal may or may not have a carrier frequency, and the carrier frequency may or may not be modulated in the encoded signal. These and other details of particular modulation types are well known to those skilled in the art of electronics and communications, and need not be described in greater detail herein.

In general, then, the modulation characteristics (e.g., modulation type and/or carrier frequency (if any) constitute one type of characteristic information that may be used to recognize the SRC. For example, if only one manufacturer uses a certain modulation format, and uses that format for all its SRCs, and uses the same code sets for all such SRCs, then that modulation format would uniquely identify the code set needed for that manufacturer's line of SRCs.

The modulation signal will comprise a series of pulses (e.g., infrared bursts), separated by time. Each pulse comprises one or more "on" or "high" data. The spaces between pulses comprise the "off" or "low" data. The on-off pairs are also known in the art as mark-space pairs. That is, the "on" duration is referred to as a "mark," and the "off" duration is referred to as a "space." In general, then, the mark-space characteristics (e.g., timing) of a signal form another type of characteristic information that can be used to recognize the SRC.

Finally, some remote control key functions use a transmission protocol that involves repetition of one or more portions of the signal during the transmission. That is, the repeated portion may include the header, data portion, and/or the tail. For example, keys such as "Channel up" and "Volume Down" typically are programmed to keep transmitting for as long as such keys are pressed by the user. In addition (depending on the manufacturer's chosen protocol), even keys that do not keep transmitting a signal (such as the "Power" key) may partially or wholly repeat the signal in some manner. In general, then, the repetition characteristics of a transmission form yet another type of characteristic information that can be used to recognize the SRC.

When multiple signals (or portions thereof) are used, the lag (or delay) time between the repeated portions of the signals may be used as another type of characteristic information.

In the foregoing examples, then, the characteristic information may include some or all of the following: (1) modulation characteristics (e.g., modulation type and/or carrier frequency); (2) mark-space characteristics (e.g., timing); (3) signal repetition characteristics; and/or (4) signal lag time. Of course, the foregoing are merely exemplary, and those skilled in the art will readily appreciate that still other characteristics of any given SRC's signal transmission may also be used as the characteristic information.

B. Determining Modulation Characteristics

Techniques for determining the modulation characteristics (e.g., modulation type and carrier frequency) are well known in the art and need not be described in detail here. For example, photosensor-equipped IR receiver modules that can be used for determination of the modulation type are widely commercially available. Further, if a terminal of the photosensor is measured relative to the receiver's ground (using, say, an oscilloscope), the carrier frequency can be readily determined as well. See, for example, "IR Remote Control Basics," published in September, 1999, by Brian Millier and available at www.circuitcellar.com/library/ccofeature/millier0999/ c99bm2.htm, which is hereby incorporated by reference for all purposes. Those skilled in the art will readily appreciate how to implement such techniques (or equivalents thereof) using a combination of hardware and/or software appropriate to the form factor of a URC.

C. Determining Mark-Space Characteristics

Among the exemplary modulation types listed in Section V.A above, CCM is the most common type of IR signal in the U.S. market. Thus, for ease of explanation, the description in this Section shall refer to CCM signals. One skilled in the art will appreciate that the various embodiments described herein (and generalizations thereof) are not limited to CCM signals but can also be applied to other categories of infrared signals in accordance with the requirements of a particular implementation.

CCM signals are typically transmitted with a constant carrier frequency that is modulated to provide a serial data stream. The "data" can be encoded using either pulse position modulation or pulse width modulation. That is, an infrared signal typically comprises a series of "on" and "off" bursts of an infrared light emitting diode (LED). Generally, in CCM, the position and/or width of the pulses are used to represent digital values. Thus, a binary "1" or "0" representation of a signal may be determined by evaluating a time sequence of the series of "on" and "off" bursts.

Figure 4:
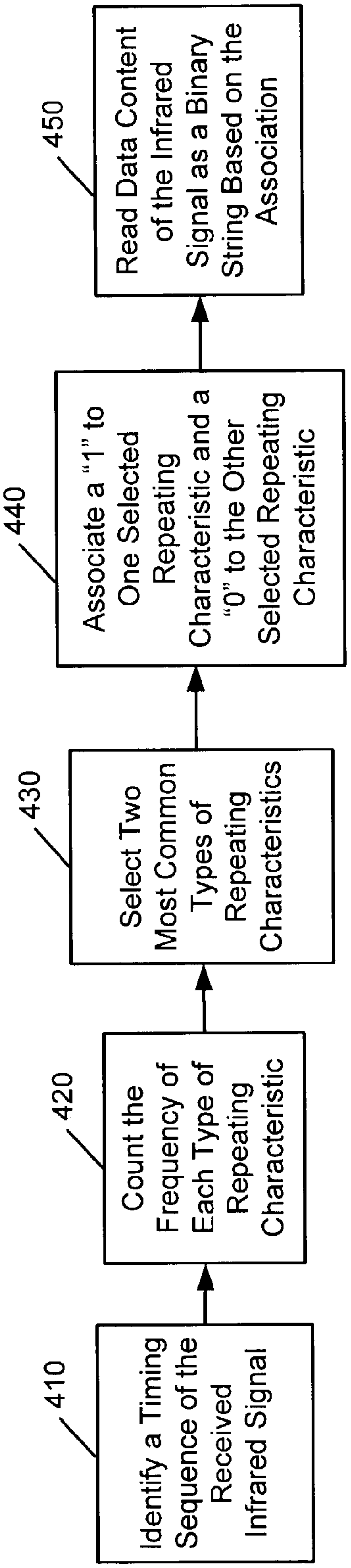
FIG. 4 illustrates an exemplary process for determining certain characteristic information.

FIG. 4 illustrates one exemplary process for determining (or representing) the data content of an infrared signal by analyzing its mark-space timing. At step 410, the data portion of the signal (i.e., exclusive of header and tail) is identified. This may take the form of a timing sequence. The durations, and time intervals between, the various on/off bursts within the sequence can be simply determined using the processor's clock 134, as well as by other standard techniques, all of which are well known to those skilled in the art and need not be described in greater detail here.

In order to convert the data to a binary signal (a series of 1s and 0s), it is necessary to identify two distinct characteristics that occur repeatedly within the signal. One such repeating characteristic will represent a "1" and the other, a "0."

Thus, at step 420, distinct repeating characteristics of the timing sequence are determined. For example, different types of mark-space timing pairs could be identified, along with the frequency (or number) of occurrence of each such type.

Then, at step 430, if there are more than two types of repeating characteristics, two of the types are selected. For example, the two most common types of mark-space timing pairs could be selected.

Next, at step 440, a first bit type is associated with one type of the selected repeating characteristics and a second bit type is associated with the second type of the selected repeating characteristics. For example, a logical "1" is associated with one of the two most common types of mark-space timing pairs and a logical "0" is associated with the other.

Finally, at step 450, the data content of the infrared signal is represented as a binary string comprised of the two bit types (e.g., "1 s" and "0s").

The process described above for determining mark-space characteristic is merely illustrative. Those skilled in the art will readily appreciate that still other processes may be implemented (e.g., depending on the type of information stored in the database). For example, the entire signal structure (e.g., all or more than two repeating timing characteristics of the timing sequence) of the received signal may be used to compare to signal structures stored in the database. This process may be desirable, for example, when a matching code set cannot be found based on the data content of a signal. Alternatively, this process may be implemented independently of determining the data content of a signal.

D. Determining a Repetition Pattern

Generally, an infrared signal includes one or more of the following in addition to data: header, tail, repeat transmission and delay. The header generally signals the infrared signal receiver 110 (see FIG. 1) to watch for signal data. The tail is typically transmitted after data have been transmitted.

Many infrared signals transmit data, header, and/or tail more than once as long as a key on a remote control is held down. That is, the transmission includes some degree of redundancy. This redundancy can occur within a single signal, or take the form of repeating signals (or portions thereof) within an overall transmission. For example, some implementations may repeat the data portions of a signal, while other signals may repeat header and/or tail portions, in addition to (or instead of) data. The redundancy (e.g., presence of repeat pulses and how often the data, header and/or tail is repeated) can be useful in identifying a specific SRC. For example, the repetition pattern can be quantified as an absolute number (e.g., 4 repetitions per signal or per transmission) or as a frequency (e.g., 2 repetitions per millisecond, or 2 KHz).

E. Determining Signal Lag Time

Once the individual repeating signals (or portions thereof) are identified, the associated lag time is straightforwardly determined using the timing techniques described earlier. These are well known in the art and need not be described in detail here.

VI. Other Exemplary Aspects and Embodiments

A. Troubleshooting

Referring back to step 260 of FIG. 2, the URC may be put into a troubleshooting mode when an SRC is not recognized by the URC. For example, the particular characteristic information used by the URC to test the SRC may not be sufficient to uniquely recognize a given SRC. This might occur, for example, where identification of a limited number of SRCs (e.g., from a particular manufacturer) requires much more characteristic information than other commonly available SRCs. As a matter of convenience, the URC's recognition process might be "optimized for the majority" by implementing faster testing (e.g., against less characteristic information) sufficient to identify the majority of SRCs, with a fallback to a troubleshooting mode (involving additional testing against more detailed characterstic information) to deal with the more difficult-to-recognize SRCs.

For example, suppose that most SRCs can be uniquely identified without consideration of their lag times, but that some difficult-to-recognize SRCs require lag time determination. In such a scenario, the lag time could be interrogated from the previously-received signal. Or, if necessary depending on the SRC configuration, the user could be required to press a key more than once, to hold down a key, etc. Once the lag time is determined, the SRC can be identified.

The lag time-based troubleshooting technique provided above is merely illustrative. Those skilled in the art will readily appreciate that still other troubleshooting techniques may be implemented depending on the types and characteristics of the SRCs to be recognized. For example, any of various types of characteristic information described herein may be used for troubleshooting. In addition, the URC may revert to the learning mode if the SRC cannot be recognized. Alternatively or in combination, the URC may store any determined characteristic information to be used to find a matching code set at a later time when the database is updated. Exemplary techniques for updating the URC are described below in Section VI.B.

B. Updating the URC

In an exemplary implementation, the database (or other information, such as programming code) in the URC may be periodically updated. For example, the URC may include a USB port (and/or other ports/interfaces known in the art) for connecting to an external computing device (e.g., a personal computer) to download data to upgrade the database stored in the URC. For example, the computing device may be connected to a network (e.g., the Internet) that has access to software upgrades for the URC. Implementation of a USB port is well known in the art and need not be described in detail herein.

One exemplary use of updating enables the URC to recognize a new model of SRC that was not known at the time the URC was built (or was otherwise not reflected in the code sets programmed into the URC at the time of purchase). After updating its database with new characteristic information and/or new code sets, the URC can then re-test a previously unrecognized SRC to see if it is now recognized.

C. Remote Code Set Determination

In another exemplary implementation, if the URC remembers the characteristic information for the SRC (which the URC determined but was unable to match), the URC can provide this to the remote computing device. The remote computing device may be configured to perform a recognition process using the provided characteristic information to identify the SRC, and to provide the appropriate code set back to the URC. The code set would be provided in the form of an electromagnetic signal appropriate to the type of interface and connection between the URC and the remote device. For example, such signal could be optical (e.g., infrared), electrical (e.g., for use with a wired or wireless modem), or otherwise. In an exemplary implementation, the remote code set determination may be performed as a troubleshooting technique when a SRC cannot be recognized in a recognition process performed at the URC.

D. URC as SRC

Finally, although the SRC has been disclosed above as being specific to particular electronic devices (consumer electronics, garage door openers, automobile key fobs, etc.), the SRC could itself also be a URC. For example, a user could be replacing one URC with another, for example, because the old URC was fully loaded, obsolete, broken in some way, or simply because the user wanted to replace or otherwise replicate it.

VII. Operating Environment

The embodiments described herein may be implemented in an operating environment comprising software installed on a universal remote control, in hardware of a universal remote control, or in a combination of software and hardware.

The software and/or hardware would typically include some type of computer-readable media which can store data and logic instructions (such as those which, when executed, enables automatic programming of a universal remote control) that are accessible by a micro-processing unit or the processing logic within the hardware. Such media might include, without limitation, any type of magnetic or optical or future-developed media. For example, suitable random access memories (RAMs) might include DRAM, SRAM, flash memory cards and the like, while suitable read only memories (ROMs) might include EPROMs, and the like. Depending on the implementation, the media can be fixed (e.g., SRAM) or removable (e.g., Compact Flash or Memory Stick flash memory cards).

The universal remote control may be used in any application where one wishes to duplicate the functionality of one or more individual remote controls. This might include consumer electronics (TVs, VCRs, etc.), garage door openers, automobile remote control key fobs, etc.

VIII. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims.

What is claimed is:

1. A method for programming a universal remote control, comprising:

(a) receiving at least one signal from a source remote control;

(b) determining characteristic information based on said signal;

(c) comparing said characteristic information to a database of said universal remote control;

(d) determining a matching code set for said source remote control based on said comparison; and (e) configuring said universal remote control to mimic control features of said source remote control based on said matching code set, wherein said determining in said (b) includes:

(1) identifying a timing sequence based on said signal;

(2) determining a plurality of repeating characteristics of said timing sequence;

(3) associating one type of repeating characteristic as a first bit type;

(4) associating a second type of repeating characteristic as a second bit type; and (5) representing said timing sequence as a binary string comprised of said bit types.

2. The method of claim 1, wherein said (a) includes moving at least one of said source remote control and said universal remote control until a sufficiently strong signal is being received by said universal remote control.

3. The method of claim 2, further comprising triggering a signal to a user of said universal remote control that said signal is sufficiently strong.

4. The method of claim 1, wherein said signal includes redundant information, and wherein third type of repeating characteristic is a pattern of repetition of said redundant information.

5. The method of claim 1, wherein said signal includes redundant information, wherein said characteristic information includes a signal lag time, and wherein said signal lag time is a time between said redundant information.

6. The method of claim 1, further comprising:

(f) performing one or more troubleshooting techniques if no matching code set is determined at said (d).

7. The method of claim 1, further comprising:

(f) connecting to a network; and (g) updating said database via said network.

8. The method of claim 1, wherein said matching code set is stored in said database of said universal remote control.

9. The method of claim 1, wherein said characteristic information includes a timing sequence of a series of "on" and "off" bursts.

10. The method of claim 9, wherein said characteristic information includes more than two mark-space timing pairs.

11. A method for programming a universal remote control, comprising:

(a) receiving at least one signal from a source remote control;

(b) determining characteristic information based on said signal, wherein said characteristic information is taken from the group consisting of: a modulation type, a carrier frequency, a mark-space characteristic, a signal repetition characteristic and a signal lag time;

(c) comparing said characteristic information to a database of said universal remote control;

(d) determining a matching code set for said source remote control based on said comparison;

(e) configuring said universal remote control to mimic control features of said source remote control based on said matching code set; and (f) performing one or more troubleshooting techniques if no matching code set is determined at said (d), wherein said performing further comprises:

(1) connecting to a remote computer;

(2) transmitting said characteristic information to said remote computer and thereby allowing said remote computer to find a matching code set; and (3) receiving said matching code set from said remote computer.

12. The method of claim 11 wherein said modulation type is taken from the group consisting of: constant carrier modulation (CCM), base band (BB) modulation, frequency shift keying (FSK) and complex frequency shift keying (C_FSK).

13. A computer readable medium for executing a computer method, comprising logic instructions that, if executed:

(a) receive at least one signal from a source remote control;

(b) determine characteristic information based on said signal, wherein said characteristic information is taken from the group consisting of: a modulation type, a carrier frequency, a mark-space characteristic, a signal repetition characteristic and a signal lag time;

(c) compare said characteristic information to a local database;

(d) determine a matching code set for said source remote control based on said comparison;

(e) configure a universal remote control to mimic control features of said source remote control based on said matching code set;

(f) connect to a remote computer if no matching code set is determined at said (d);

(g) transmit said characteristic information to said remote computer, thereby allowing said remote computer to find a matching code set; and (h) receive said matching code set from said remote computer.

14. The computer readable medium of claim 13, wherein said logic instructions include logic instructions that, if executed, (1) identify a timing sequence based on said signal;

(2) determine said characteristic information by converting at least a portion of said timing sequence into a binary string.

15. The computer readable medium of claim 13, wherein said signal includes redundant information, and said logic instructions for determining characteristic information in (b) include logic instructions that, if executed, determine a pattern of repetition of said redundant information.

16. The computer readable medium of claim 15, wherein said signal lag time is a time between said redundant information.

17. The computer readable medium of claim 13, further comprising logic instructions that, if executed:

(f) connect to a network; and (g) update said database via said network.

18. The computer readable medium of claim 13, wherein said carrier frequency of said signal is constant.

19. The computer readable medium of claim 13, wherein said mark-space characteristic is a timing sequence of a series of "on" and "off" bursts.

20. The computer readable medium of claim 13, wherein said modulation type is taken from the group consisting of: constant carrier modulation (CCM), base band (BB) modulation, frequency shift keying (FSK) and complex frequency shift keying (C_FSK).

21. The computer readable medium of claim 13, wherein said signal includes redundant information, and wherein said signal repetition characteristic is a pattern of repetition of said redundant information.

22. The computer readable medium of claim 21, wherein said signal lag time is a time between said redundant information.

* * * * *

UNITED STATES PATENT AND TRADEMARK OFFICE

CERTIFICATE OF CORRECTION

PATENT NO. : 7,106,209 B2

APPLICATION NO. : 10/361281
DATED : September 12, 2006
INVENTOR(S) : Daniel SauFu Mui It is certified that error appears in the above-identified patent and that said Letters Patent is hereby corrected as shown below:

COLUMN 10, LINES 10-13, SHOULD READ:

4. The method of claim 1, wherein said signal includes redundant information, and wherein a third type of repeating characteristic is a pattern of repetition of said redundant information.

Signed and Sealed this

Twelfth Day of December, 2006

JON W. DUDAS
*Director of the United States Patent and Trademark Office*